(12) United States Patent
Kwon et al.

(10) Patent No.: US 6,763,367 B2
(45) Date of Patent: Jul. 13, 2004

(54) PRE-REDUCTION TECHNIQUE WITHIN A MULTIPLIER/ACCUMULATOR ARCHITECTURE

(75) Inventors: Ohsang Kwon, Cupertino, CA (US); Kevin J. Nowka, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 623 days.

(21) Appl. No.: 09/733,720

(22) Filed: Dec. 11, 2000

(65) Prior Publication Data

US 2003/0158879 A1 Aug. 21, 2003

(51) Int. Cl.[7] .............................................. G06F 7/52
(52) U.S. Cl. ...................... 708/620; 708/629; 708/630
(58) Field of Search ................................. 708/700–714, 708/620–632, 523

(56) References Cited

U.S. PATENT DOCUMENTS

| | | | | |
|---|---|---|---|---|
| 4,727,507 A | * | 2/1988 | Miyanaga | 708/629 |
| 4,958,312 A | * | 9/1990 | Ang et al. | 708/603 |
| 5,042,001 A | * | 8/1991 | Brightman et al. | 708/490 |
| 5,220,525 A | * | 6/1993 | Anderson et al. | 708/631 |
| 5,751,619 A | * | 5/1998 | Agarwal et al. | 708/523 |
| 5,847,981 A | * | 12/1998 | Kelley et al. | 708/603 |
| 5,944,776 A | * | 8/1999 | Zhang et al. | 708/625 |
| 6,434,587 B1 | * | 8/2002 | Liao et al. | 708/629 |
| 6,519,621 B1 | * | 2/2003 | Yano | 708/603 |
| 6,535,901 B1 | * | 3/2003 | Grisamore | 708/629 |

* cited by examiner

Primary Examiner—Todd Ingberg
Assistant Examiner—Chat C. Do
(74) Attorney, Agent, or Firm—Casimer K. Salys; Dillon & Yudell LLP (57) ABSTRACT

An apparatus and method for compressing a reduction array into an accumulated carry-save sum. The reduction array includes a partial product matrix, a carry-save sum, and a constant value row. A compressor array generates a previous accumulated carry-save sum. A three-input/two-output carry-save adder pre-reduces the constant value row and the previously accumulated carry-save sum into a two-row intermediate carry-save sum that is added to the partial product matrix to form a current accumulated carry-save sum.

10 Claims, 6 Drawing Sheets

PRE-REDUCTION TECHNIQUE WITHIN A MULTIPLIER/ACCUMULATOR ARCHITECTURE

CROSS REFERENCE TO RELATED APPLICATIONS

The present application is related to co-pending U.S. patent application Ser. No. 09/584,893, filed on Jun. 01, 2000. The above mentioned patent application is assigned to the assignee of the present invention, the content of which is incorporated herein by reference.

BACKGROUND OF THE INVENTION

1. Technical Field

The present invention relates in general to multiplier/accumulator (MAC) circuits, and in particular to a system and method for simplifying the reduction process in a MAC architecture. More particularly, the present invention relates to a MAC architecture having a pre-reduction mechanism for reducing the number of processing stages in the critical MAC path.

2. Description of the Related Art

Multiply-accumulate (MAC) operations are frequently undertaken in computer systems because they lend themselves to multiplying matrices, which is common in digital signal processing and video/graphics applications. An accumulator within a MAC design is a binary computation device comprising an adder/subtractor and an accumulation register. A multiplier is added to the accumulator to form the MAC architecture. Most advanced digital systems employ MAC circuits to perform high-speed parallel multiply/add operations.

Due to its computation-intensive nature and the overhead hardware required, MAC is an costly operation in terms of design expense and speed. Any improvement in the delay for performing a MAC operation would have a positive impact on allowable clock speed, instruction time, and processor performance.

Figure 1:
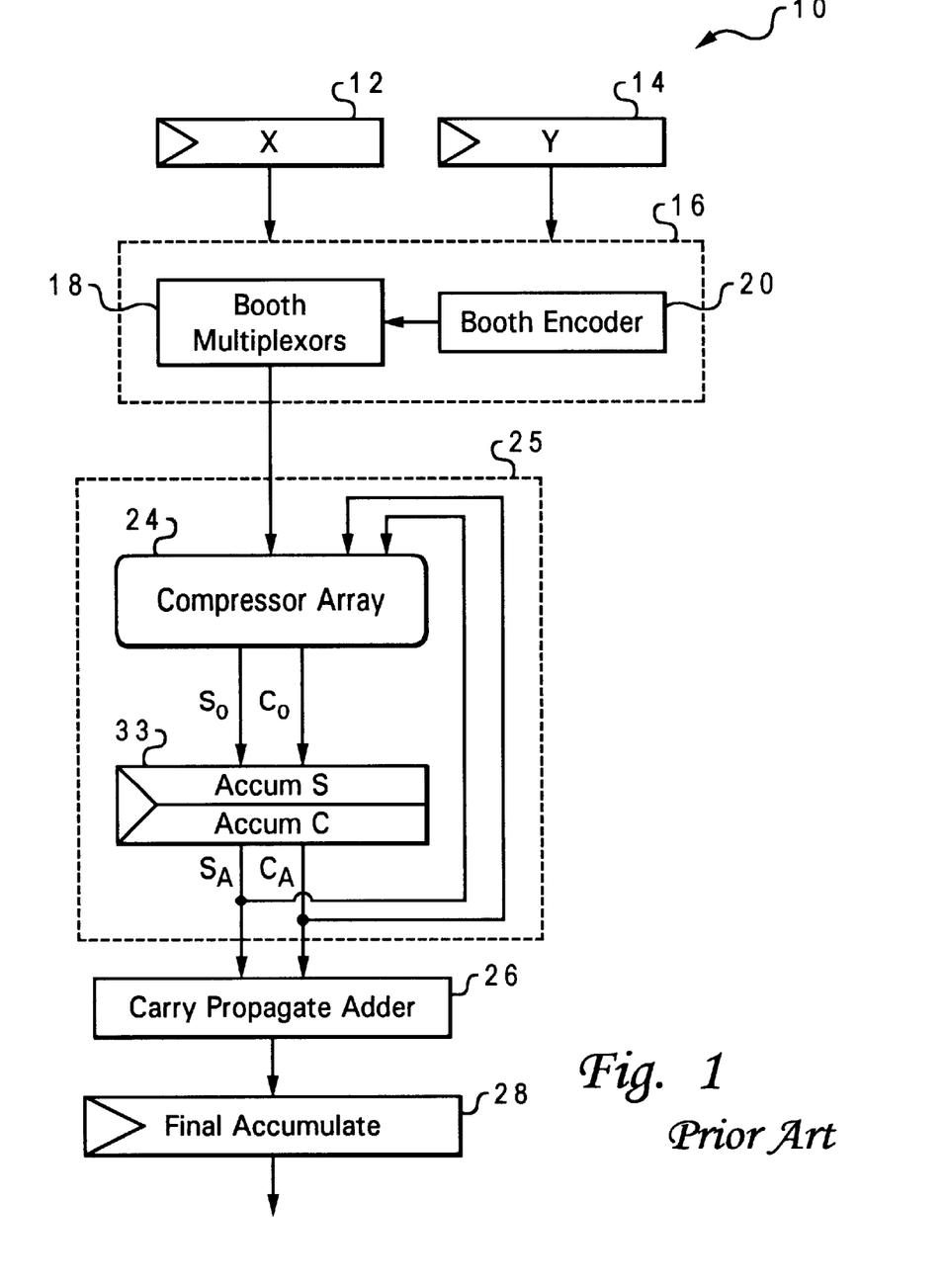
FIG. 1 illustrates a conventional redundant-form multiply accumulate circuit.

With reference to FIG. 1, there is depicted a conventional MAC circuit that includes multiply and accumulate functionality for performing addition and multiplication operations in parallel. Specifically, FIG. 1 illustrates a MAC circuit 10 for multiplying a 16-bit multiplicand, Y, by a 16-bit multiplicator, X. A pair of registers, 14 and 12, store multiplicand Y and multiplicator X respectively, until MAC circuit 10 is given a "multiply" instruction whereupon registers 12 and 14 deliver the operands to the multiplication circuitry within MAC circuit 10.

The multiplication functionality within MAC circuit 10 may be divided into two stages. The first stage includes a partial product generator 16 and a reduction circuit 25, wherein partial product generation and carry-save addition (reduction) are performed. The second stage includes a carry propagate adder 26 that adds a redundant-form accumulated sum within an accumulation register 33, to a final, non-redundant accumulated sum within a final accumulation register 28.

Figure 3A:
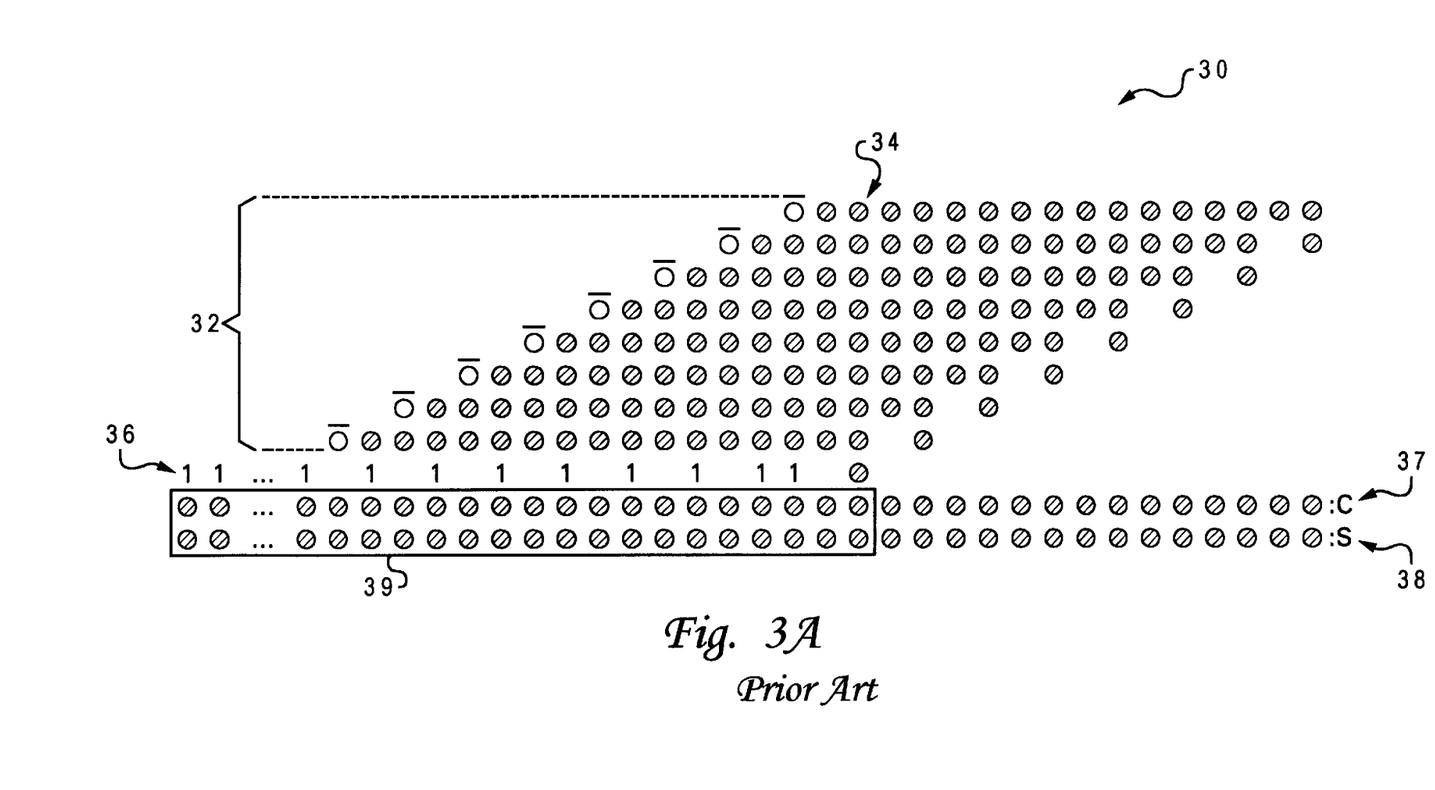
FIG. 3A illustrates a reduction array generated within a conventional multiply accumulate circuit.

Partial product generator 16 processes multiplicand Y and multiplicator X utilizing a modified Booth algorithm (MBA) to produce a partial product matrix (PPM) such as PPM 32 illustrated in FIG. 3A. MBA is widely adopted for partial product generation in large (16-bits and greater) multipliers.

As further depicted in FIG. 1, partial product generator 16 includes a Booth encoder 20 and Booth multiplexors 18 for implementing the MBA. A major benefit of using a MBA for producing a PPM from partial product generator 16 is that instead of generating n partial products for an n-bit multiplication, the MBA generates approximately half of that.

In accordance with well-known MBA principles, a signed binary number in its 2'-complement form is partitioned into overlapping groups of three bits. By coding each of these groups, an n-bit signed binary number is represented as a sum of n/2 signed digits. Since each signed digit assumes the possible values of 0, ±1, or ±2, the required partial products are all power-of-two multiples of the multiplicand (Y in the depicted example), which are readily available. The logic required to implement the functionality of partial product generator 16 is well-known in the art and is therefore not explicitly depicted in FIG. 1.

The individual partial product terms (represented as dots within PPM 32) are generated by partial product generator 16. With reference to FIG. 3A, the result of the Booth recoding performed by partial product generator 16 is evidenced by the eight partial products within PPM 32 for a 16-bit multiplication.

As shown in FIG. 3A, PPM 32 forms the upper portion of a reduction array 30 that is applied as an input to a reduction tree within reduction circuit 25. The lower portion of reduction array 30 comprises the redundant (carry-save) form of an accumulated sum row 38 and an accumulated carry row 37 that were formed in the previous accumulation step and which are added to the partial products within PPM 32 from the current multiplication cycle to form the current redundant accumulator result.

Between PPM 32 and accumulated rows 38 and 37, an additional row 36 consists of constant values to ensure proper sign extensions for each row of partial products within PPM 32, and also to set the sign bit of the most significant partial product that is introduced to support two's complementation required for negative partial products in the MBA.

Turning back to FIG. 1, reduction circuit 25 includes a compressor array 24 for compressing the bit rows constituting reduction array 30 such that PPM 32 and constant value row 36 are compressed into newly accumulated sum row 38 and carry row 37. For notational and illustrative convenience with reference to FIG. 3A, constant value row 36, together with the portions of sum and carry rows 38 and 37 enclosed by block 39 may be referred to collectively as block 39.

With reference to FIG. 1 and FIG. 3A, after PPM 32 has been produced by partial product generator 16, an array of compressor circuits within compressor array 24 are employed to reduce the height of reduction array 30 at its highest point at column 34, from eleven to two. The compressor array includes circuits for performing carry-save additions in order to compress the eight rows of PPM 32 and constant value row 36 into sum row 38 and carry row 37.

Counter circuits or compressor circuits are utilized to add the rows of PPM 32, constant value row 36, and sum-carry rows 38 and 37 into a newly accumulated sum-carry redundant form.

For the examples presented in FIGS. 1 and 3A, three concatenated levels of 4:2 compressor circuits are required within compressor array 24 to reduce the eleven rows in reduction array 30 to a final redundant sum-carry result. Such 4:2 compressor circuits can be constructed with three levels of two-input XOR logic gates in the critical path. Each level of logic within compressor array 24 adds to the overhead and delay of MAC circuit 10.

Compressor array 24 is a hardware intensive component within the architecture of MAC 10. The number of rows (column depth) is a major limiting factor in minimizing the required number of logic gate levels within compressor array 24 and maximizing the overall speed of MAC 10. It would therefore be useful to provide a system and method for reducing hardware overhead and accelerating the reduction process in a MAC circuit by pre-reducing the reduction array.

SUMMARY OF THE INVENTION

An apparatus and method for compressing a reduction array into an accumulated carry-save sum are disclosed herein. The reduction array includes a partial product matrix, a carry-save sum, and a constant value row. A compressor array generates a previous accumulated carry-save sum. A three-input/two-output carry-save adder pre-reduces the constant value row and the previously accumulated carry-save sum into a two-row intermediate carry-save sum that is added to the partial product matrix to form a current accumulated carry-save sum.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Figure 2:
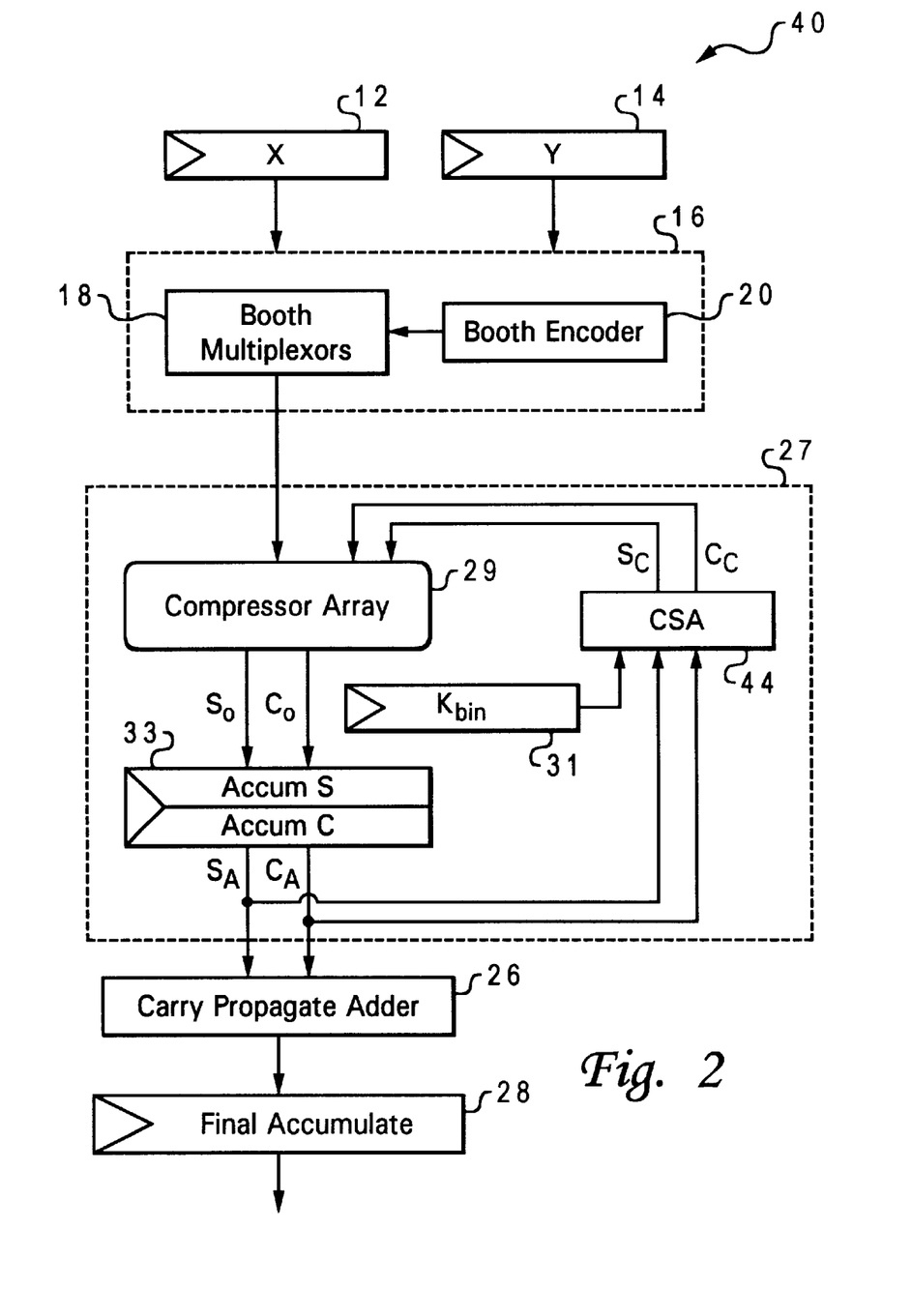
FIG. 2 depicts a multiply accumulate circuit having a pre-reduction mechanism in accordance with a preferred embodiment of the present invention.

With reference now to the figures wherein like reference numerals refer to like and corresponding parts throughout, and in particular with reference to FIG. 2, there is depicted a multiply accumulate (MAC) circuit that includes multiply and accumulate functionality for performing addition and multiplication operations in parallel. Specifically, FIG. 2 illustrates a MAC circuit 40 for multiplying 16-bit multiplicand, Y, by 16-bit multiplicator, X. A pair of registers, 14 and 12, store multiplicand Y and multiplicator X, respectively, until MAC circuit 40 is given a "multiply" instruction whereupon registers 12 and 14 deliver the operands to the multiplication circuitry within MAC circuit 40.

As with MAC circuit 10, the multiplication functionality within MAC circuit 40 may be divided into a partial product generator/reducer stage followed by an adder stage. In the depicted embodiment, the partial product generator/reducer stage comprises partial product generator 16 and a reduction circuit 27. The adder stage includes a carry propagate adder 26 and a final accumulation register 28.

Figure 3B:
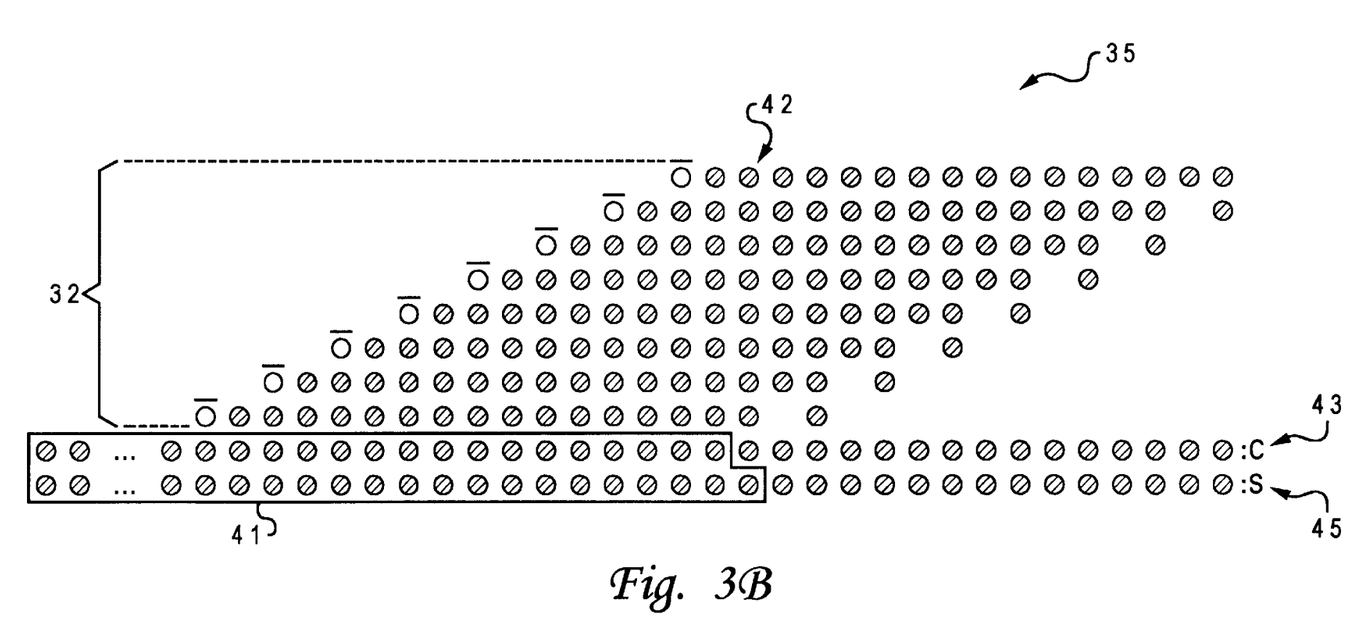
FIG. 3B depicts a pre-reduced reduction array generated in accordance with a preferred embodiment of the present invention.

Partial product generator 16 employs a Booth encoder 20 and Booth multiplexors 18 which implement a modified Booth's algorithm (MBA) for generating partial products. With reference to FIGS. 2 and 3B, partial product generator 16 generates the same PPM 32 as generated by MAC circuit 10 from operands Y and X.

In accordance with well-known MBA principles, a signed binary number in its 2's-complement form is partitioned into overlapping groups of three bits. By coding each of these groups, an n-bit signed binary number is represented as a sum of n/2 signed digits. Since each signed digit assumes the possible values of 0, ±1, or ±2, the required partial products are all power-of-two multiples of the multiplicand (Y in the depicted example), which are readily available. The logic required to implement the functionality of partial product generator 16 is well-known in the art and is therefore not explicitly depicted in FIG. 2.

Reduction circuit 27 includes a compressor array 29 for compressing the bit rows constituting pre-reduced reduction array 35. As illustrated in FIG. 2, compressor array 29 receives as inputs, PPM 32 from the output of partial product generator 16, as well as a sum and carry output from a three-input/two-output carry-save adder 44. A carry-save output from compressor array 29 is delivered to accumulator register 33. Following the reduction stage embodied by reduction circuit 27, a carry-propagate adder 26 adds the redundant sum-carry form of accumulator register 33 to form a final non-redundant accumulated sum within final accumulator register 28.

Referring to FIG. 3B, there is illustrated a pre-reduced reduction array 35 that is processed by reduction circuit 27 in accordance with the teachings of the present invention. The individual partial product terms 10 (represented as dots within PPM 32 ) are generated by partial product generator circuit 16. The result of the Booth recoding performed by partial product generator 16 is evidenced by the eight rows of partial products in PPM 32 for a 16-bit multiplication. PPM 32 forms the upper portion of pre-reduced reduction array 35 which is input into reduction circuit 27. The lower portion of pre-reduced reduction array 35 comprises a carry-save output consisting of a current-cycle carry row 43 and a current-cycle sum row 45.

It should be noted that unlike the reduction array depicted in FIG. 3A, pre-reduced reduction array 35 includes no constant value row between the carry save output and PPM 32. As described in further detail below, reduction circuit 27 includes means for pre-reducing the three rows depicted as block 39 (FIG. 3A) into two rows within block 41 (FIG. 3B). Such pre-reduction is useful for minimizing the number of compression levels required within compressor array 29.

To achieve the aforementioned pre-reduction of pre-reduced reduction array 35, reduction circuit 27 further includes a dedicated register 31 for storing a constant value row, $k_{bin}$, wherein $k_{bin}$ is analogous in structure and function to row 36 in FIG. 3A. The output of dedicated register 31 is applied to an input of a three-input/two-output adder 44. Connected to the other two inputs of three-input/two-output adder 44, are the sum and carry outputs from accumulator register 33.

During a current reduction cycle performed within compressor array 29, the result of the previous reduction cycle is stored in accumulator register 33. For purposes of illustration the previously reduced result will be referenced as carry-save output rows 37 and 38 in FIG. 3A. The reduced result of the previous cycle is depicted in FIG. 3B as a carry-save rows 37 and 38. The portion of carry-save rows 37 and 38 enclosed by block 39 is added within three-input/two-output adder 44 to constant value row $k_{bin}$. In a preferred embodiment, carry-save adder 44 adds constant value row $k_{bin}$ together with the portions of the sum and carry row within block 39 to produce the carry-save result in block 41 which represents the most significant portion of sum row 45 and carry row 43 for the next multiplication cycle. Therefore, the maximum number of rows within pre-reduced reduction array 35, as determined by the height of column 42 is ten rather than eleven as it would be without such pre-reduction.

Compressor array 29 employs adder/compressor circuits for compressing the bit rows constituting reduction array 35 such that PPM 32, accumulated sum row 45, and an accumulated carry row 43, are compressed to form the subsequent sum and carry form of the accumulation. This reduction is achieved by compressor circuits that perform carry-save additions in order to compress the eight rows of PPM 32 into sum row 45 and carry row 43. After reduction within compressor array 29, the height of reduction array 35 is reduced from ten at its highest point at column 42 to two. For the conventional MAC architecture illustrated in FIG. 1, three concatenated 4:2 adders are required within compression array 24 to reduce the array height from eleven to two.

For compressor array 29, however, the input reduction array height has been pre-reduced within reduction circuit 27 to a maximum of ten rows. Therefore a pair of concatenated five-input/two-output compressors may be utilized within compressor array 29. An exemplary five-input/two-output compressor that may be implemented within compressor array 29 is depicted in FIG. 5.

Figure 4:
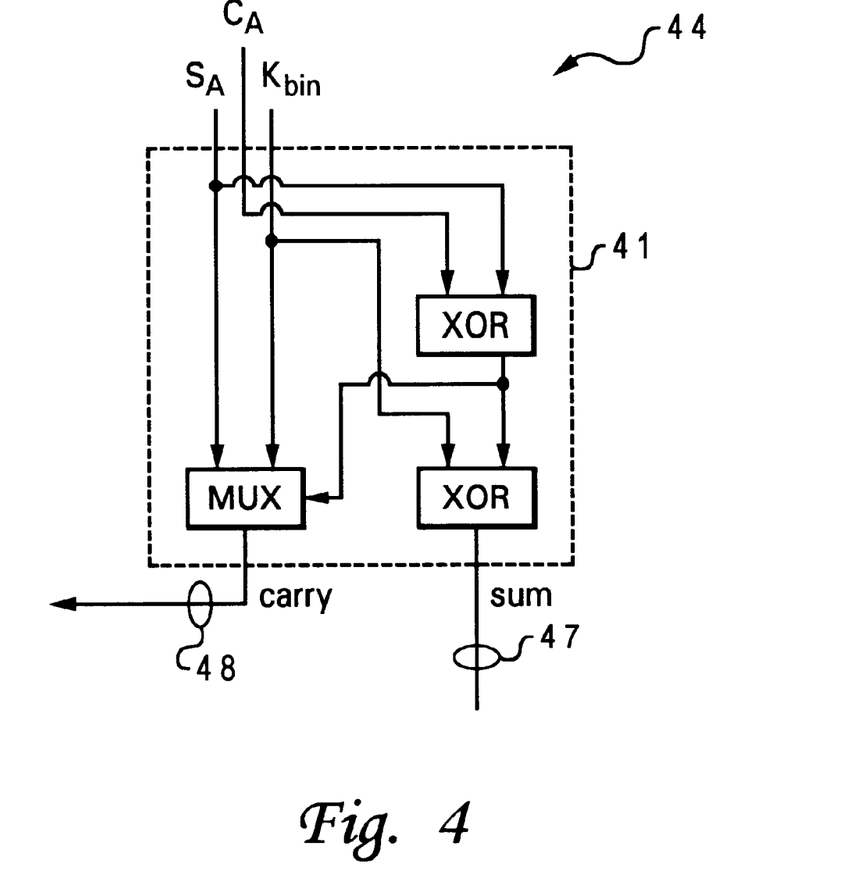
FIG. 4 is a block diagram of a three-input/two-output adder for pre-reducing a reduction array in accordance with a preferred embodiment of the present invention.

Referring now to FIG. 4, there is illustrated a block diagram of a direct implementation of three-input/two-output adder 44. Three-input/two-output adder 44 combines inputs $S_A$, $C_A$, and $k_{bin}$, to generate a pre-reduced sum output 47 and a carry output 48.

The time delay for three-input/two-output adder 44 can be qualitatively measured by the total number of levels of XOR gates utilized. Three-input/two-output adder 44 requires two levels of XOR gates. The delay through two levels of XOR gates is typically less than the delay of Booth's recoding algorithm 16, and thus, the pre-reduction through three-input/two-output adder 44 adds no latency to the critical path.

Figure 5:
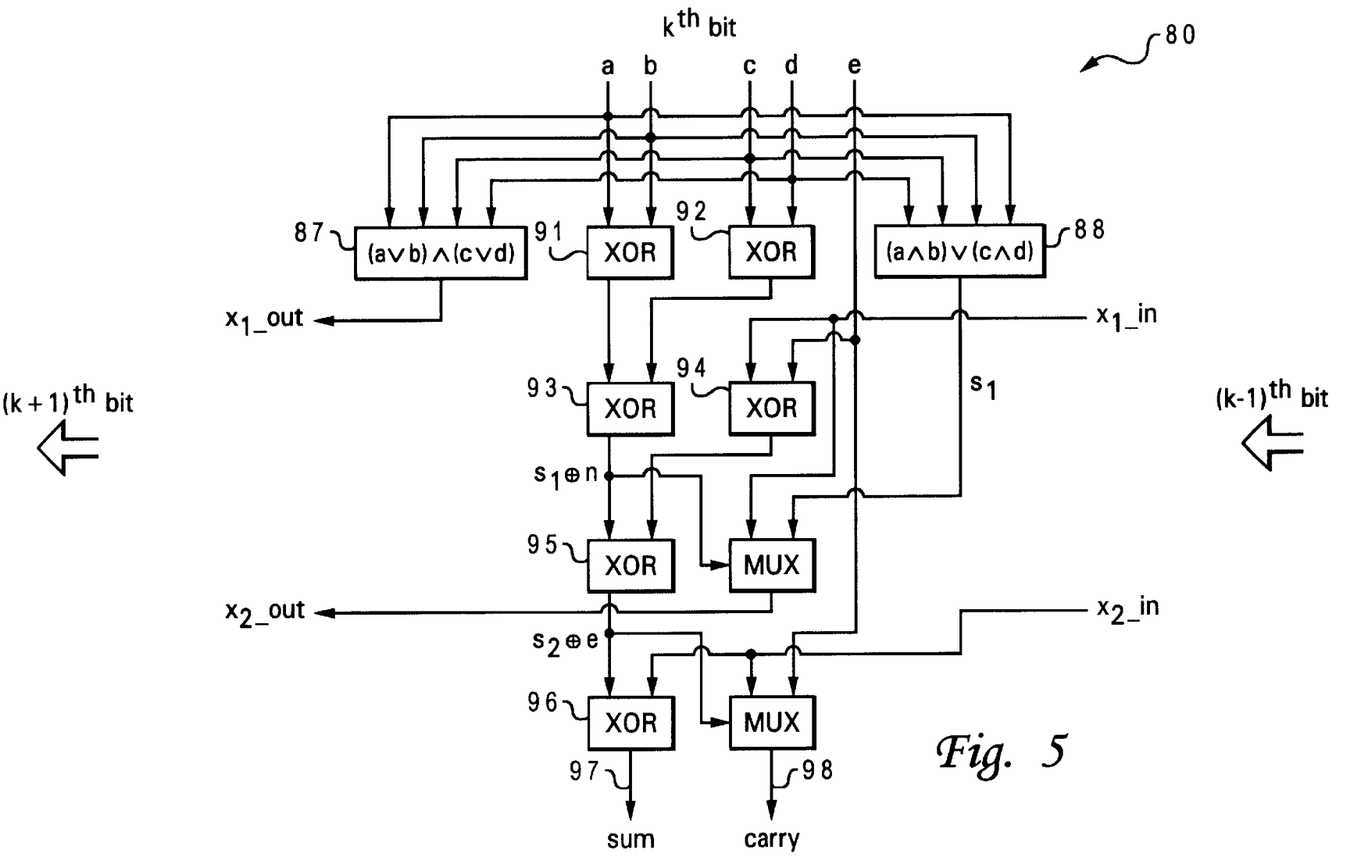
FIG. 5 is a block diagram of a five-input/two-output compressor that may be advantageously utilized to compress a partial product matrix into a sum-carry redundant accumulated form in accordance with a preferred embodiment of the present invention.

With reference now to FIG. 5, there is illustrated a block diagram of a five-input/two-output compressor 80 that may be advantageously utilized to compress the pre-reduced reduction array into the accumulated carry-save output in accordance with a preferred embodiment of the present invention. Five-input/two-output adder 80 combines inputs a, b, c, d, and e to generate a sum output 97 and a carry output 98. However, five-input/two-output adder 80 only requires four levels of XOR gates. Specifically, at level one, an XOR gate 91 combines input a and input b, and an XOR gate 92 combines input c and input d. At level two, an XOR gate 93 combines the results from XOR gate 91 and XOR gate 92, and an XOR gate 94 combines input e and a first carry-out (i.e., x1_in) from a previous stage of five-input/two-output adder 80. At level three, an XOR gate 95 combines the results from XOR gate 93 and XOR gate 94. At level four, an XOR gate 96 combines the results from XOR gate 95 and a second carry-out (i.e., x2_in) from the previous stage of five-input/two-output adder 80. The logic operations shown within blocks 87 and 88 are preferably performed at level one in conjunction with XOR gates 91 and 92.

In order for five-input/two-output adder 80 to operate correctly, the following equation must be satisfied:

$$a+b+c+d+e+x1\_in+x2\_in=2(x1\_out+x2\_out+carry)+sum$$

For the convenience of illustration, various results of (a+b+c+d) are mapped out in Table I, where a, b, c, and d are input values of either a logical 0 or logical 1.

TABLE I

| a + b + c + d | other conditions | x1_out | n | s1 |
|---|---|---|---|---|
| 0 | | 0 | 0 | 0 |
| 1 | | 0 | 1 | 0 |
| 2 | (a and b) or © and d) | 0 | 1 | 1 |
| | (a or b) and © or d) | 1 | 0 | 0 |
| 3 | | 1 | 0 | 1 |
| 4 | | 1 | 1 | 1 |

In Table I, column a+b+c+d represents the sum of inputs a+b+c+d, column other conditions represents the two different conditions in which the sum total of inputs a+b+c+d equals two, columns x1_out, n, and s1 represent different intermediate values within five-input/two-output adder 80.

Based on the result listed in Table I, the following equations hold true:

$$x1\_out = (a \text{ or } b) \text{ and } © \text{ or } d);$$

$$s1 = (a \text{ and } b) \text{ or } © \text{ and } d);$$

$$s1 \text{ xor } n = (a \text{ xor } b) \text{ xor } © \text{ xor } d);$$

and $$a+b+c+d = 2(x1\_out) + s1 + n \tag{1}$$

For the equations, "and" denotes a logical AND operation, "or" denotes a logical OR operation, and "xor" denotes a logical XOR (exclusive OR) operation. The 2 (x1_out) in equation (1) denotes x1_out being a higher significant position than s1+n. By defining x2_out and s2 as carry and save of (s1+n+x1_in), respectively, the following equations are formed:

$$\begin{aligned}
x2\_out &= (s1 \text{ and } n) \text{ or } (s1 \text{ and } x1\_in) \text{ or} (n \text{ and } x1\_in) \tag{2}\\
&= (s1 \text{ and } n) \text{ or } (x1\_in \text{ and}(s1\_in \text{ or } n))\\
&= \{\overline{(s1 \text{ xor } n)} \text{ and } s1\} \text{or}((s1 \text{ xor } n) \text{ and } x1\_in);\\
s2 &= (s1 \text{ xor } n) \text{xor } x1\_in;\\
&\text{and } s1 + n + x1\_in = 2(x2\_out) + s2
\end{aligned}$$

In a similar manner, let carry and sum be the carry and sum of (s2+e+x2_in), respectively, and the following equations are formed:

$$\text{carry} = \{(s2 \text{ xor } e) \text{ and } e\} \text{ or } (s2 \text{ xor } e) \text{ and } x2\_in);$$

$$\text{sum} = (s2 \text{ xor } e) \text{ xor } x2\_in;$$

and $$s2 + e + x2\_in = 2 \text{ (carry)} + \text{sum} \tag{3}$$

From equations (1), (2), and (3), $$\begin{aligned}
a + b + c + d + e + x1\_in + x2\_in &= \\
2(x1\_out) + s1 + n + e + x1\_in + &\\
x2\_in &= 2(x1\_out) + 2(x2\_out) + s2 + e + \\
x2\_in &= 2(x1\_out + x2\_out + \text{carry}) + \text{sum}
\end{aligned}$$

Thus, it is shown that five-input/two-output adder 20 generates x1_out, x2_out, carry, and sum according to their definitions in the corresponding equations.

By arranging the equations, it is shown that five-input/two-output adder 80 combines input values a, b, c, d, and e to generate a sum value and a carry value, as follows:

$$\begin{aligned}
\text{sum} &= (s2 \text{ xor } e) \text{xor } x2\_in\\
&= (s1 \text{ xor } n \text{ xor } x1\_in) \text{ xor } e \text{ xor } x2\_in\\
&= (a \text{ xor } b \text{ xor } c \text{ xor } d) \text{ xor } x1\_in \text{ xor } e \text{ xor}
\end{aligned}$$

$$x2\_in = a \text{ xor } b \text{ xor } c \text{ xor } d \text{ } x \text{ or } e \text{ xor } x1\_in \text{ xor } x2\_in$$

$$\begin{aligned}
\text{carry} &= \{\overline{(s1 \text{ xor } n \text{ } x1\_in \text{ xor } e)} \text{ and } e\}\\
&\quad \text{or}\{(s1 \text{ xor } n \text{ xor } x1\_in \text{ xor } e) \text{ and } x2\_in\};\\
&= \{\overline{(a \text{ xor } b \text{ xor } c \text{ xor } d \text{ xor } x1\_in \text{ xor } e)} \text{ and } e\}\\
&\quad \text{or } \{(a \text{ xor } b \text{ xor } c \text{ xor } d \text{ xor } x1\_in \text{ xor } e) \text{ and } x2\_in\}
\end{aligned}$$

Five-input/two-output 80 only has four levels of XOR delays on its critical path. It is understood by those skilled in the art that the five-input/two-output adder of the present invention can be utilized to implement various multipliers or fused multiply-adders within a processor. Furthermore, when utilized within compressor 24, several five-input/two-output adders of the present invention can be concatenated to provide 5:2, 10:2, 15:2, 20:2 compressions.

While the invention has been particularly shown and described with reference to a preferred embodiment, it will be understood by those skilled in the art that various changes in form and detail may be made therein without departing from the spirit and scope of the invention.

What is claimed is:

1. A reduction circuit for compressing a carry-save partial product matrix having n rows, a constant value row, and a stored carry-save accumulated sum, into a carry-save accumulator, said reduction circuit comprising:

a compressor array for generating an accumulated carry-save sum, said compressor array includes circuit means for performing an (n+2)-to-2 compression, wherein said circuit means for performing an (n+2)to-2 compression includes two adders, wherein each of said adders includes four levels of logic gates coupled between five inputs and two outputs for combining values received at said five inputs to generate a sum value and a carry value at said two outputs, wherein said four levels of logic gates includes XOR logic gates; and a carry-save adder coupled between said carry-save accumulator and said compressor array for pre-reducing said constant value row and said accumulated carry-save sum into a two-row intermediate carry-save sum.

2. The reduction circuit of claim 1, wherein said carry-save adder is configured to receive said accumulated carry-save sum from an output of said compressor array at its input and to deliver said two-row intermediate sum to an input of said compressor array from its output.

3. The reduction circuit of claim 1, wherein said carry-save adder includes three inputs and two outputs.

4. The reduction circuit of claim 1, wherein said reduction circuit further includes circuit means for applying said two-row intermediate carry-save sum and said partial product matrix as inputs to said compressor array for each compression cycle.

5. The reduction circuit of claim 1, wherein said adder includes two levels of XOR gates.

6. The reduction circuit of claim 1, wherein said reduction circuit further includes:

circuit means for applying said accumulated carry-save sum from said output of said compressor array to said carry-save adder;

circuit means for applying said constant value row to said carry-save adder; and circuit means for applying said two-row intermediate carry-save sum from said output of said carry-save adder to the said input of said compressor array.

7. The reduction circuit of claim 6, wherein said circuit means for applying said accumulated carry-save sum from said compressor array to said carry-save adder includes an accumulation register having an input connected to said compressor array and an output connected to said carry-save adder.

8. The reduction circuit of claim 6, wherein said circuit means for applying said constant value row to said carry-save adder includes a register that stores a constant binary value for ensuring correct sign extensions for each row within said partial product matrix.

9. The reduction circuit of claim 1, wherein said sum value is generated by a xor b xor c xor d xor e xor x1_in xor x2_in, wherein a, b, c, d, and e are input values, wherein x1_in and x2_in are values from a previous stage.

10. The reduction circuit of claim 1, wherein said carry value is generated by {(a xor b xor c xor d xor e xor x1_in xor x2 xor e) and e} or {(a xor b xor c xor d xor x1_in xor e) and x2_in}, wherein a, b, c, d, and e are input values, wherein x2_in is a value from a previous stage.

* * * * *

UNITED STATES PATENT AND TRADEMARK OFFICE
CERTIFICATE OF CORRECTION

PATENT NO. : 6,763,367 B2
DATED : July 13, 2004
INVENTOR(S) : Kwon et al.

It is certified that error appears in the above-identified patent and that said Letters Patent is hereby corrected as shown below:

Column 10,
Lines 5-9, should read:
-- 10. the reduction circuit of claim 1, wherein said carry value is generated by {( a xor b xor c xor d xor e xor x1_in xor x2 xor e ) and e} or {(a xor b xor c xor d xor x1_in xor e) and x2_in}, wherein a, b, c, d, and e are input values, wherein x2_in is a value from a previous stage. --

Signed and Sealed this

Second Day of August, 2005

JON W. DUDAS
*Director of the United States Patent and Trademark Office*